US011536948B2

(12) United States Patent
Stoppel et al.

(10) Patent No.: US 11,536,948 B2
(45) Date of Patent: Dec. 27, 2022

(54) MICROMECHANICAL LIGHT DEFLECTION DEVICE

(71) Applicant: Robert Bosch GmbH, Stuttgart (DE)

(72) Inventors: Klaus Stoppel, Mundelsheim (DE); Stefan Spiessberger, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 16/619,591

(22) PCT Filed: May 30, 2018

(86) PCT No.: PCT/EP2018/064131
§ 371 (c)(1),
(2) Date: Dec. 5, 2019

(87) PCT Pub. No.: WO2018/224365
PCT Pub. Date: Dec. 13, 2018

(65) Prior Publication Data
US 2020/0096759 A1    Mar. 26, 2020

(30) Foreign Application Priority Data

Jun. 8, 2017   (DE) .......................... 102017209645.4

(51) Int. Cl.
*G02B 26/00*     (2006.01)
*G02B 26/08*     (2006.01)
*G01S 7/481*     (2006.01)
*G02B 26/10*     (2006.01)
*G02B 27/48*     (2006.01)

(52) U.S. Cl.
CPC ........ *G02B 26/0833* (2013.01); *G01S 7/4817* (2013.01); *G02B 26/0875* (2013.01); *G02B 26/105* (2013.01); *G02B 27/48* (2013.01)

(58) Field of Classification Search
CPC ............ G02B 26/0833; G02B 26/0875; G02B 26/105; G02B 27/48; G01S 7/4817
USPC ......... 359/212.1, 212.2, 223.1, 224.1, 224.2, 359/225.1, 226.1, 290
See application file for complete search history.

(56) References Cited

U.S. PATENT DOCUMENTS

| | | | | |
|---|---|---|---|---|
| 5,325,224 | A * | 6/1994 | Lang ................... | H04Q 11/0001 398/55 |
| 7,054,051 | B1 * | 5/2006 | Bloom ................... | G02B 26/06 359/276 |
| 2012/0300197 | A1 | 11/2012 | Richter et al. | |
| 2015/0198800 | A1 * | 7/2015 | Freedman .............. | G06V 40/19 348/46 |

(Continued)

FOREIGN PATENT DOCUMENTS

| CN | 102981276 A | 3/2013 |
|---|---|---|
| CN | 103257449 A | 8/2013 |

(Continued)

OTHER PUBLICATIONS

International Search Report for PCT/EP2018/064131, dated Aug. 28, 2018.

*Primary Examiner* — William Choi
(74) *Attorney, Agent, or Firm* — Norton Rose Fulbright US LLP; Gerard Messina (57) ABSTRACT

A micromechanical light deflection device, including a micromechanical light deflection unit and a transparent cover for the micromechanical light deflection unit, the transparent cover including at least one passive beam shaping unit for a light beam.

18 Claims, 9 Drawing Sheets

(56) References Cited

U.S. PATENT DOCUMENTS

2015/0370085 A1   12/2015   Kilcher et al.

FOREIGN PATENT DOCUMENTS

| | | |
|---|---|---|
| CN | 104555885 A | 4/2015 |
| CN | 106154540 A | 11/2016 |
| DE | 10135107 A1 | 2/2003 |
| DE | 10347962 A1 | 5/2005 |
| DE | 102007025330 A1 | 12/2008 |
| DE | 102009058762 A1 | 6/2011 |
| DE | 102011004477 A1 | 9/2012 |
| DE | 102011006159 A1 | 9/2012 |
| DE | 112013002917 T5 | 2/2015 |
| DE | 102015217908 A1 | 3/2017 |
| EP | 2591875 A1 | 5/2013 |
| JP | H08327927 A | 12/1996 |
| JP | 2011008105 A | 1/2011 |
| JP | 2016065964 A | 4/2016 |
| WO | WO-2008016223 A1 * | 2/2008 ........... H04N 9/3111 |
| WO | 2015164843 A1 | 10/2015 |

* cited by examiner

MICROMECHANICAL LIGHT DEFLECTION DEVICE

FIELD

The present invention relates to a micromechanical light deflection device, including a micromechanical light deflection unit and a transparent cover for the micromechanical light deflection unit.

The present invention also relates to a method for deflecting light with the aid of a micromechanical light deflection device, a light beam being deflected with the aid of a light deflection unit.

Although the present invention may, in general, be applied to micromechanical light deflection devices, the present invention is described with reference to micromechanical mirrors or, synonymously, MEMS mirrors.

Although the present invention may, in general, be applied to transparent covers of any kind, the present invention is described with reference to transparent covers in the form of cover glasses.

Although the present invention may, in general, be applied to electromagnetic waves of any wavelength, the present invention is described with reference to visible light.

BACKGROUND INFORMATION

Micromechanical light deflection devices are used in LIDAR systems, among other things. These, for example, utilize the light beam of a laser, which is deflected or diffracted to irradiate a certain area. If this light beam strikes an object in the area, it is possible, for example, to ascertain a distance between the object and the LIDAR system based on the back-scattered light, or more precisely the light propagation time between the LIDAR system and the object. For example, micromechanical mirror systems—MEMS mirror systems—may be used for this purpose, to accordingly deflect or diffract a light beam. Such a MEMS mirror device is usually protected by a transparent cover and is hermetically sealed, so that a micromechanical mirror movably situated therein is protected against environmental influences.

A micromechanical mirror system including MEMS mirrors and a cover became described in U.S. Patent Application Publication No. US 2015/0370085 A1. A piezoelectric actuator, which is connected to a transparent layer for the deformation thereof, is integrated into the cover.

A lighting device for vehicles including a rack frame is shown in German Patent Application No. DE 103 479 62 A1, which includes an LED covered by a cover glass. An optic system is integrated into the cover glass in the process.

SUMMARY

In one specific embodiment, the present invention provides a micromechanical light deflection device, including a micromechanical light deflection unit and a transparent cover for the micromechanical light deflection unit, the transparent cover including at least one passive beam shaping unit for a light beam.

In another specific embodiment, the present invention provides a method for deflecting light with the aid of a micromechanical light deflection device, a light beam being deflected with the aid of a light deflection unit of the micromechanical light deflection device, and the light beam being shaped with the aid of a passive beam shaping unit situated in a transparent cover of the light deflection unit.

In another specific embodiment, the present invention provides a light transmission device, including a micromechanical light deflection unit, and a light transmission unit, in particular, in the form of a laser, preferably a spotlighting semiconductor laser, or a semiconductor laser of the "edge emitter" type.

One of the advantages achieved thereby is that a cost-effective cover is made available in this way, since it may be used both as a cover for the light deflection unit and as a beam shaping element for the light beam of a light source, for example of a laser transmission unit. In this way, the adjustment complexity and the number of optical components of the micromechanical deflection device overall are also reduced. Furthermore, it is also possible to considerably reduce the installation space between the light deflection unit and a transmission optics; for example, the installation space for a LIDAR unit including a transmission unit and a light deflection unit may thus be considerably reduced. Moreover, it is also possible to design the micromechanical light deflection unit in a more compact manner since, for example, a required mirror surface may be reduced: with the aid of the passive beam shaping unit, a focus of a light beam, for example of a laser, may be placed onto a MEMS mirror. Furthermore, the manufacture of the micromechanical light deflection device overall is also easier since the cover and the passive beam shaping unit may be manufactured in one production process/production step.

In other words, by integrating the passive beam shaping unit into the cover, a cost-effective, easily manufacturable and compact micromechanical light deflection device is provided.

The term "beam shaping unit" shall be understood in the broadest sense and refers to elements, units, devices and the like which alter the shape of a beam, for example its cross section, its direction or the like.

The term "passive" with respect to a beam shaping unit shall be understood in the broadest sense and refers to elements, units, devices and the like which are not alterable, adaptable, regulatable or the like as a function of parameters of the beam. In particular, this shall not be understood to mean any active elements, units, devices, actuators and the like which require energy in the form of current or the like for beam shaping.

Further features, advantages and further specific embodiments of the present invention are described hereafter or become apparent thereby.

According to one advantageous refinement of the present invention, the passive beam shaping unit is situated on an inlet for the micromechanical light deflection device. One of the advantages achieved thereby is that situating the passive beam shaping unit in the cover on the inlet for the micromechanical light deflection device allows the light to be focused, for example, onto a MEMS mirror of the micromechanical light deflection unit, whereby the required mirror surface of the MEMS mirror may be reduced.

According to another advantageous refinement of the present invention, the passive beam shaping unit includes at least one lens, in particular one or multiple cylindrically designed lens(es). One of the advantages achieved thereby is that, for example in the case of cylindrically designed lenses, a light beam may be collimated in one direction and focused in another direction.

According to another advantageous refinement of the present invention, the passive beam shaping unit is situated on an outlet for the micromechanical light deflection device. One of the advantages achieved thereby is that, for example when the passive beam shaping unit is designed in the form of a lens, it may have a curved design, which prevents a beam line of a light beam from tilting at larger deflection angles by the micromechanical light deflection unit.

According to another advantageous refinement of the present invention, the transparent cover is designed in the form of a planar cover glass. This allows the transparent cover of the light deflection unit to be manufactured easily and cost-effectively.

According to another advantageous refinement of the present invention, the micromechanical light deflection unit includes a micromechanical mirror for light deflection, which is at least partially rotatable about at least one axis. In this way, a simple and simultaneously cost-effective micromechanical light deflection unit may be provided.

According to another advantageous refinement of the present invention, a mirror plane of the micromechanical mirror for deflecting light is in a resting position and a plane of the cover glass is rotated by an angle with respect to one another. In this way, static spurious reflections of light on the cover, in particular in the form of the cover glass, may be avoided.

According to another advantageous refinement of the present invention, the angle is between 1° and 35°, preferably between 2° and 20°, in particular, between 5° and 15°, preferably between 7.5° and 12.5°. The advantage here is that spurious reflections by the cover may thus be avoided, or at least reduced, by tilting the cover with respect to a resting position of a MEMS mirror.

According to another advantageous refinement of the present invention, the lens is designed as a cylindrical lens or as a Powell lens. One of the advantages achieved thereby is that, for example when using a Powell lens, i.e., a specially shaped aspherical cylindrical lens, an inhomogeneous light distribution of a laser beam, for example a light distribution similar to a Gaussian profile, may be homogeneously projected onto an entire line.

Further features and advantages of the present invention are described herein and are shown in the figures.

It shall be understood that the above-mentioned features and those described hereafter may be used not only in the particular described combination, but also in other combinations, or alone, without departing from the scope of the present invention.

Preferred embodiments and specific embodiments of the present invention are shown in schematic form in the figures and are described in greater detail in the description below, identical reference numerals referring to identical or similar or functionally equivalent components or elements.

DETAILED DESCRIPTION OF EXAMPLE EMBODIMENTS

Figure 1:
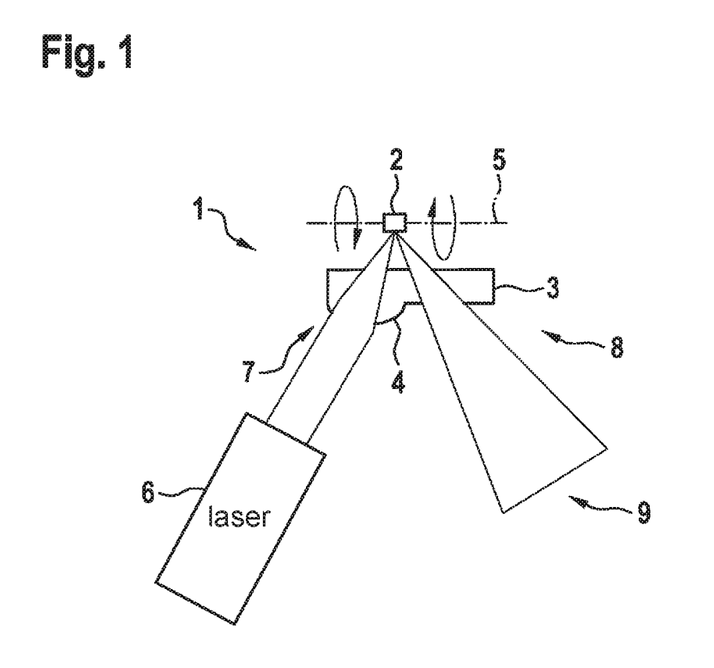
FIG. 1 shows a micromechanical light deflection device according to a first specific embodiment of the present invention.

FIG. 1 shows a micromechanical light deflection device according to a first specific embodiment of the present invention.

FIG. 1, in a top view, shows a micromechanical light deflection device 1, which includes a MEMS mirror 2, which is partially rotatable about an axis 5, for example in such a way that a laser beam 9 striking the MEMS mirror is deflectable by +/−25°. A cover glass 3, which includes a cylindrical lens 4 at inlet 7 of micromechanical light deflection device 1, is provided to cover MEMS mirror 2. The cylindrical lens is situated with its axis perpendicular to rotation axis 5 of the mirror. A laser 6 emits a laser beam 9 in the direction of micromechanical light deflection device 1 and strikes cylindrical lens 4 in the process. The laser beam is bundled and focused onto MEMS mirror 2 by cylindrical lens 4 at the inlet of micromechanical light deflection device 1. MEMS mirror 2 then accordingly reflects laser beam 9. The laser beam passes through cover glass 3 at outlet 8 of micromechanical light deflection device 1 and may then strike an object during the further course.

Figure 2A:
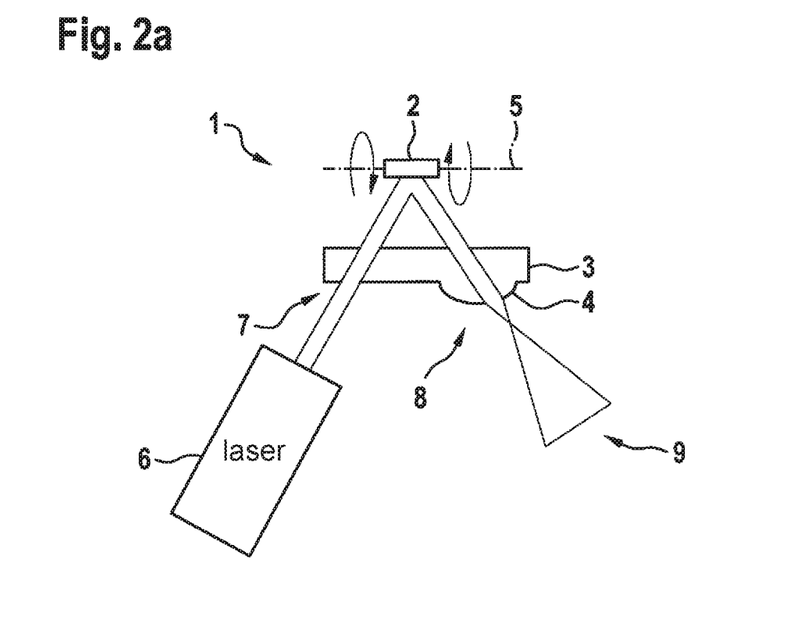
FIGS. 2a and 2b show a micromechanical light deflection device according to a second specific embodiment of the present invention.
Figure 2B:
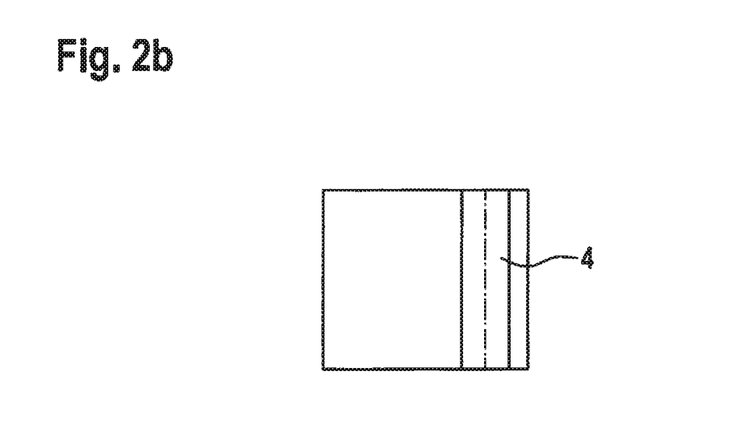

FIGS. 2a and 2b show a micromechanical light deflection device according to a second specific embodiment of the present invention.

FIGS. 2a and 2b essentially show a micromechanical light deflection device 1 according to FIG. 1. In contrast to micromechanical light deflection device 1 according to FIG. 1, cylindrical lens 4 of micromechanical light deflection device 1 according to FIGS. 2a and 2b is not situated at inlet 7 of micromechanical light deflection device 1, but at its outlet 8. Furthermore, irradiating laser 6 is designed in the form of a spotlighting semiconductor laser, preferably in the form of a VeCSEL or a VCSEL laser, by which a laser beam 9 having a round cross section, proceeding from laser 6, may be converted into a laser line 9 with the aid of cylindrical lens 4 after passing micromechanical light deflection device 1. FIG. 2b shows the view from below onto cover glass 3 including indicated cylindrical lens 4.

Figure 3A:
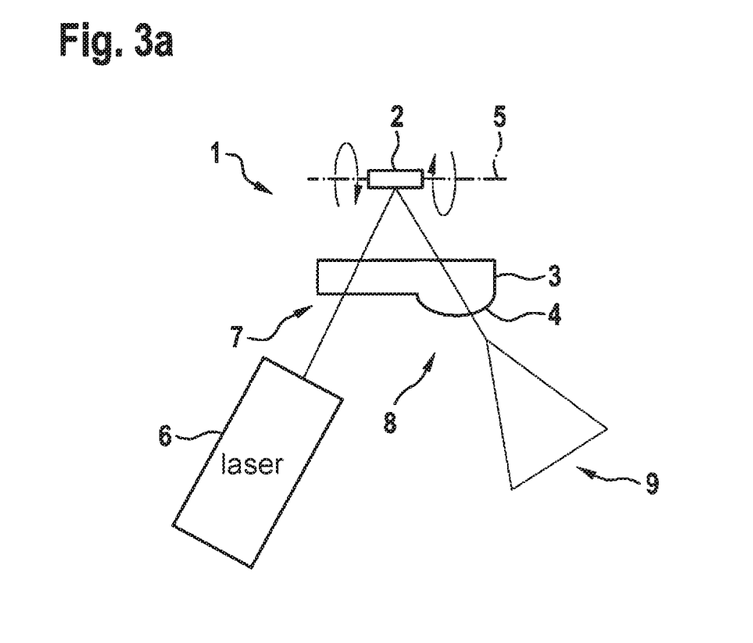
FIGS. 3a and 3b show a micromechanical light deflection device according to a third specific embodiment of the present invention.
Figure 3B:
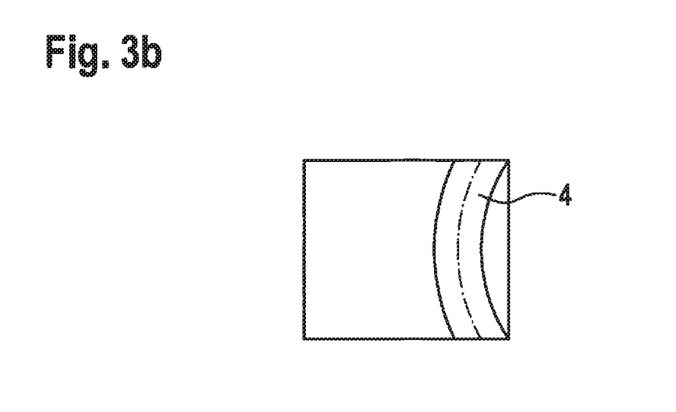

FIGS. 3a and 3b show a micromechanical light deflection device according to a third specific embodiment of the present invention.

FIGS. 3a and 3b essentially show a micromechanical light deflection device 1 according to FIG. 2. In contrast to micromechanical light deflection device 1 according to FIG. 2, a curved cylindrical lens is now situated at outlet 8 of micromechanical light deflection device 1 according to FIGS. 3a and 3b for correcting the beam offset of laser beam 9. FIG. 3b shows the view from below onto cover glass 3 including indicated curved cylindrical lens 4.

Figure 4:
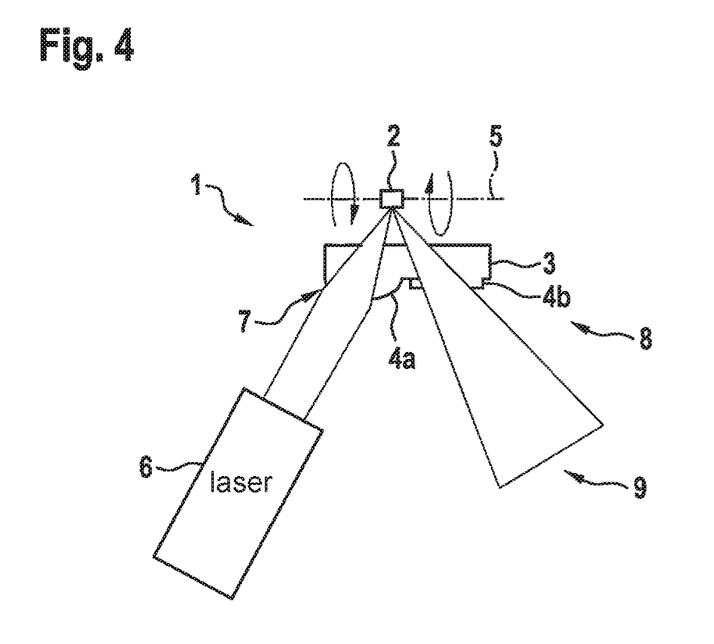
FIG. 4 shows a micromechanical light deflection device according to a fourth specific embodiment of the present invention.

FIG. 4 shows a micromechanical light deflection device according to a fourth specific embodiment of the present invention.

FIG. 4 essentially shows a micromechanical light deflection device 1 according to FIG. 1. In contrast to micromechanical light deflection device 1 according to FIG. 1, a cylindrical lens 4b is now situated at outlet 8 of micromechanical light deflection device 1 according to FIG. 4, in addition to cylindrical lens 4a at inlet 7.

Figure 5A:
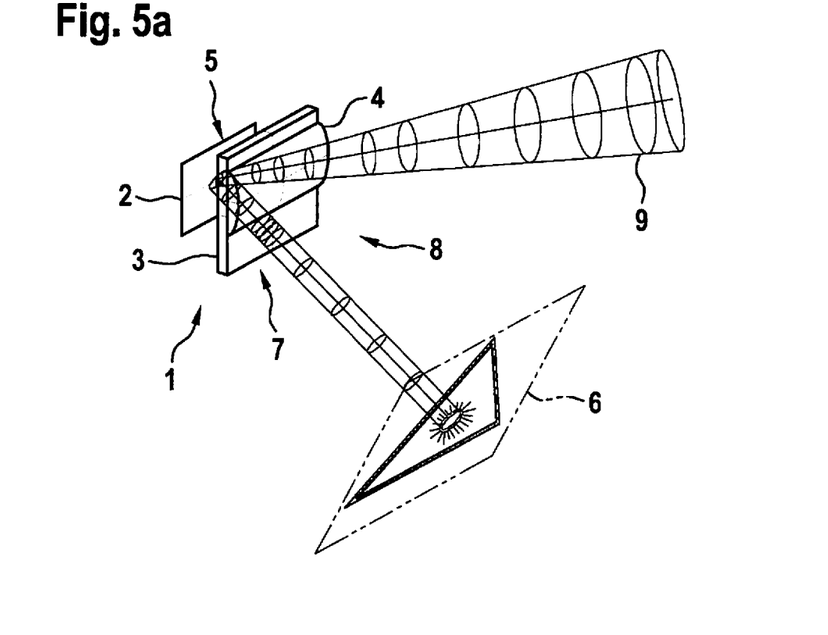
FIGS. 5a and 5b show a micromechanical light deflection device with a non-deflected mirror (FIG. 5a) and with a deflected mirror (FIG. 5b) of the specific embodiment according to FIG. 2.
Figure 5B:
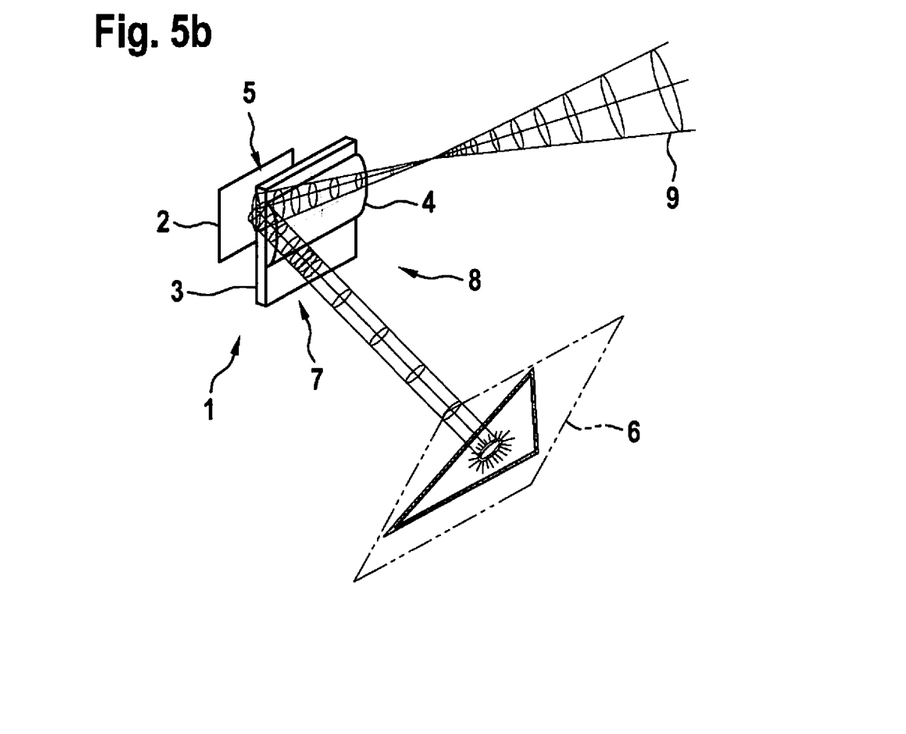

FIGS. 5a and 5b show a micromechanical light deflection device with a non-deflected MEMS mirror (FIG. 5a) and with a deflected mirror (FIG. 5b) of the specific embodiment according to FIG. 2.

In FIG. 5a, a laser 6 of the VeCSEL or VECSL type irradiates onto a non-deflected MEMS mirror 2 of a micromechanical light deflection device 1. Proceeding from laser 6, laser beam 9 strikes, unchanged in its beam shape, via inlet 7 of light deflection device 1, non-deflected MEMS mirror 2, i.e., MEMS mirror 2 in its resting position, and is accordingly deflected thereby. After the deflection by MEMS mirror 2, laser beam 9 exits through cylindrical lens 4 at outlet 8 of micromechanical light deflection device 1. During the course of the beam after passing cylindrical lens 4, laser beam 9 focuses and then widens. FIG. 5b now shows the case where a MEMS mirror 2 is deflected by a certain angle. Laser beam 9 is shaped in the process in such a way that a tilting of laser line 9 is prevented.

Figure 6A:
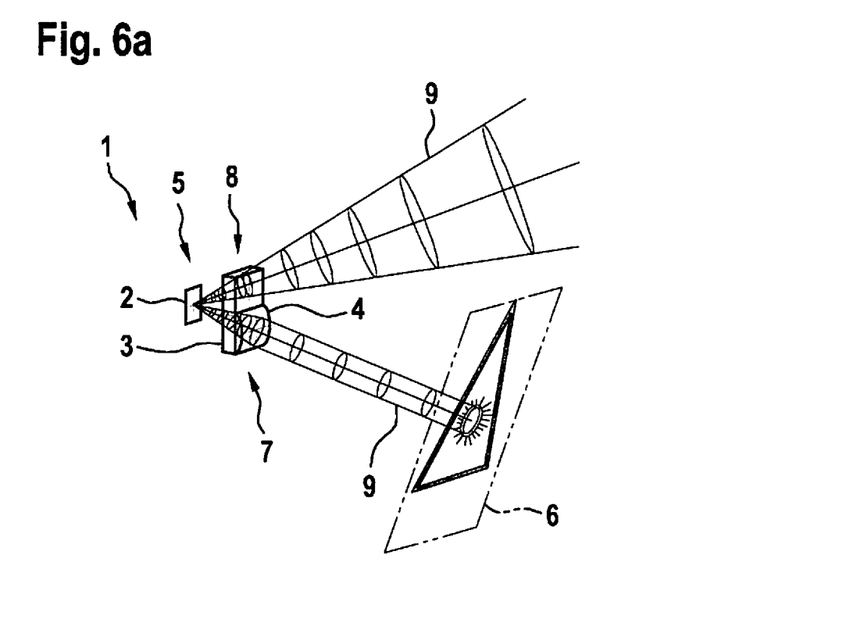
FIGS. 6a and 6b show a micromechanical light deflection device with a non-deflected mirror (FIG. 6a) and with a deflected mirror (FIG. 6b).
Figure 6B:
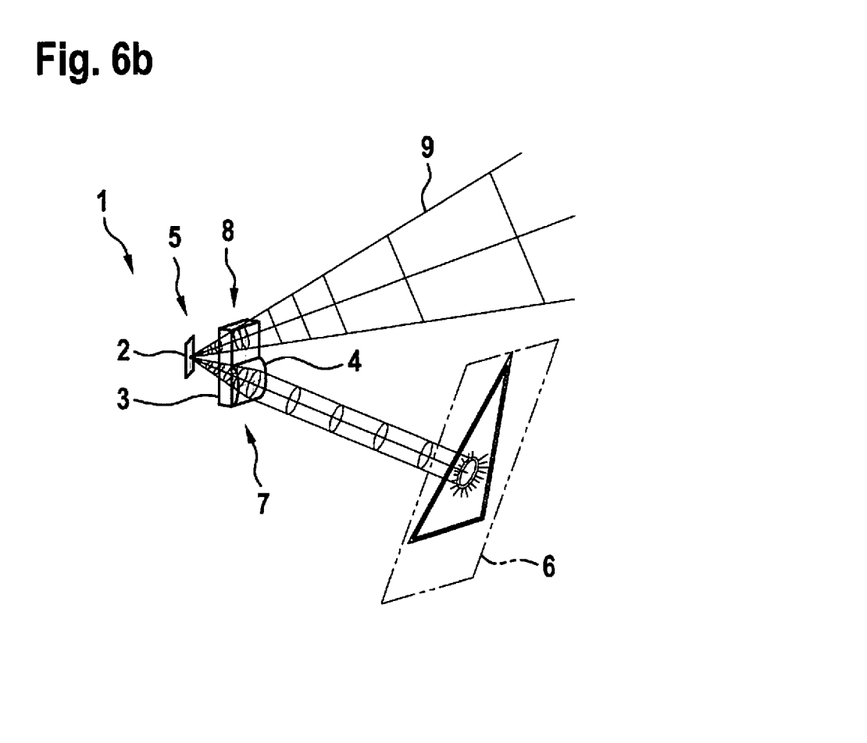

FIGS. 6a and 6b show a micromechanical light deflection device with a non-deflected MEMS mirror (FIG. 6a) and with a deflected MEMS mirror (FIG. 6b) of the specific embodiment according to FIG. 1.

FIGS. 6a and 6b essentially show a micromechanical light deflection device 1 according to FIG. 1. In contrast to micromechanical light deflection device 1 according to FIG. 1, a laser, e.g., of the VeCSEL type or of the VECSL type, is now used as laser 6 on micromechanical light deflection device 1 according to FIG. 6. Proceeding from laser 6, laser beam 9 strikes cylindrical lens 4 at inlet 7 of micromechanical light deflection device 1 and is focused onto MEMS mirror 2. Round laser beam 9 originating from laser 6 is now shaped with the aid of cylindrical lens 4 into a laser line 9 at outlet 8, after deflection by MEMS mirror 2 and after passing through cover glass 3.

Figure 7A:
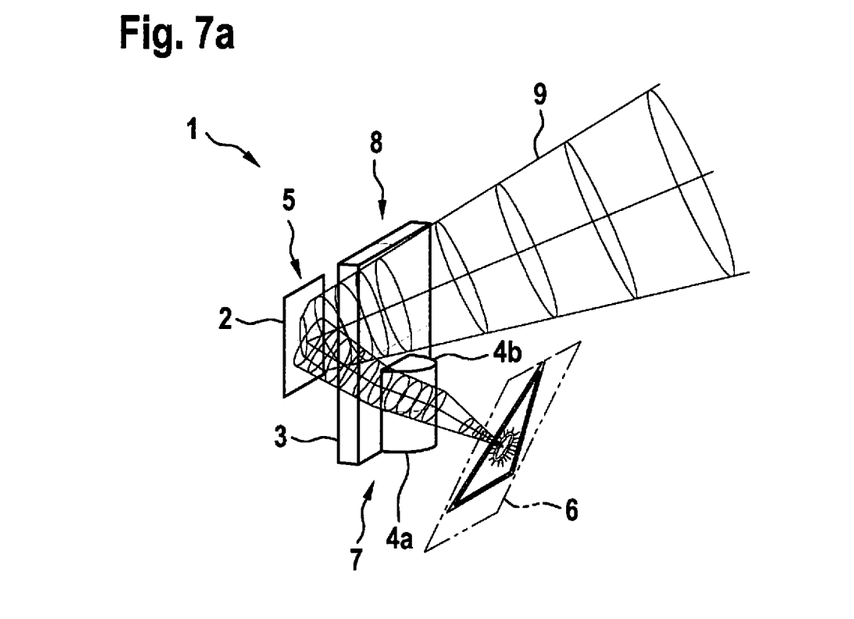
FIGS. 7a and 7b show a micromechanical light deflection device with a non-deflected mirror (FIG. 7a) and with a deflected mirror (FIG. 7b).
Figure 7B:
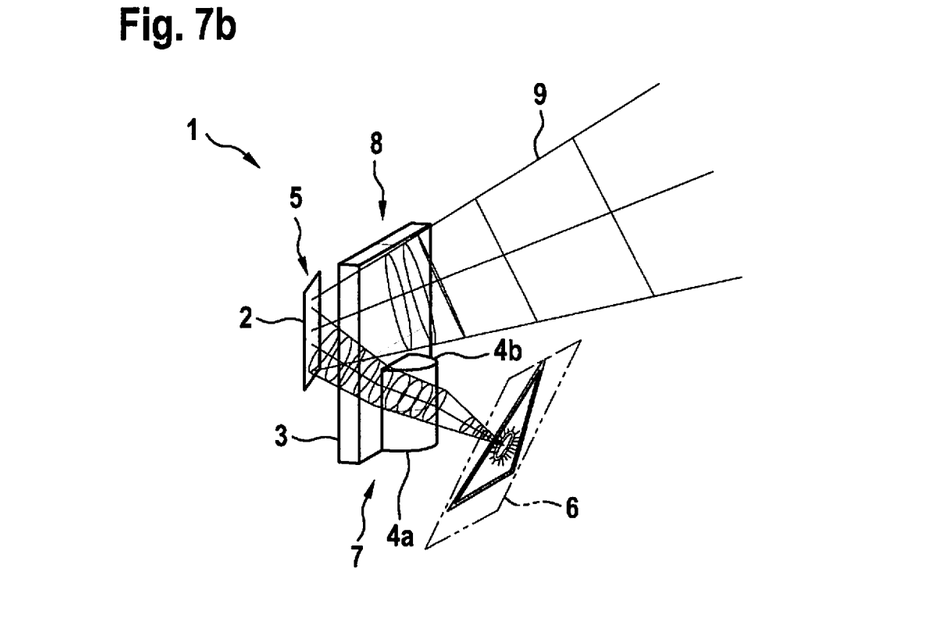

FIGS. 7a and 7b show a micromechanical light deflection device with a non-deflected MEMS mirror (FIG. 7a) and with a deflected MEMS mirror (FIG. 7b) according to another specific embodiment of the present invention.

FIGS. 7a and 7b essentially show a micromechanical light deflection device 1 according to FIG. 1. In contrast to micromechanical light deflection device 1 according to FIG. 1, a laser 6 of the "edge emitter" type, for example a laser diode, is now used on micromechanical light deflection device 1 according to FIG. 7. It has a linear exit aperture and different divergence angles in the vertical and horizontal directions. As is apparent in FIGS. 7a and/or 7b, ultimately a laser line 9, as shown in FIG. 7b, is provided at outlet 8 as a result of the use of cylindrical lens 4 upon entry of laser beam 9, subsequent passage through cover 3, deflection by rotated MEMS mirror 2, and renewed passage through cover 3. The exit angle of laser lines 9 may be adjusted by the position in the cover and the focal length of cylindrical lens 4.

Figure 8A:
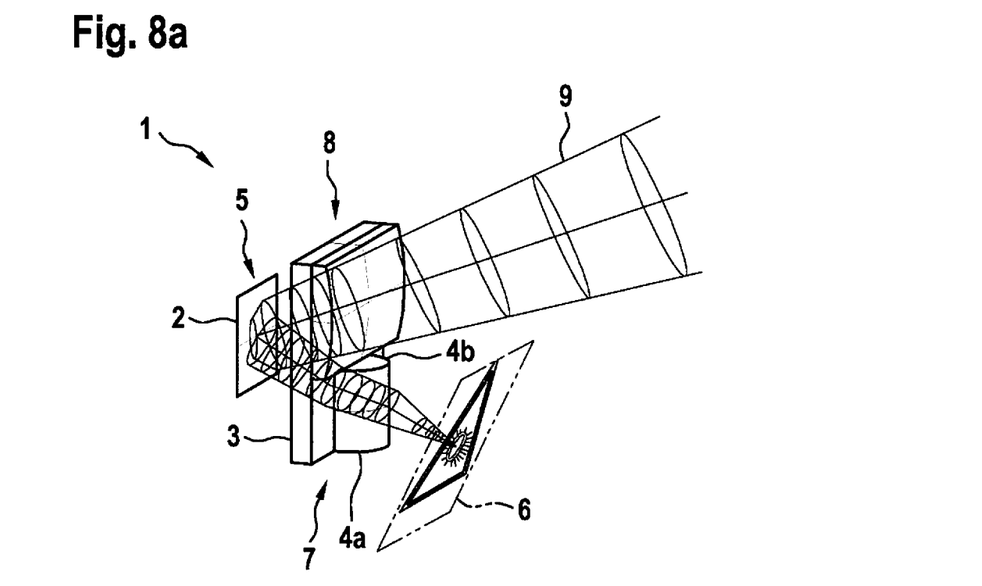
FIGS. 8a and 8b show a micromechanical light deflection device according to another specific embodiment of the present invention with a non-deflected mirror (FIG. 8a) and a deflected mirror (FIG. 8b).
Figure 8B:
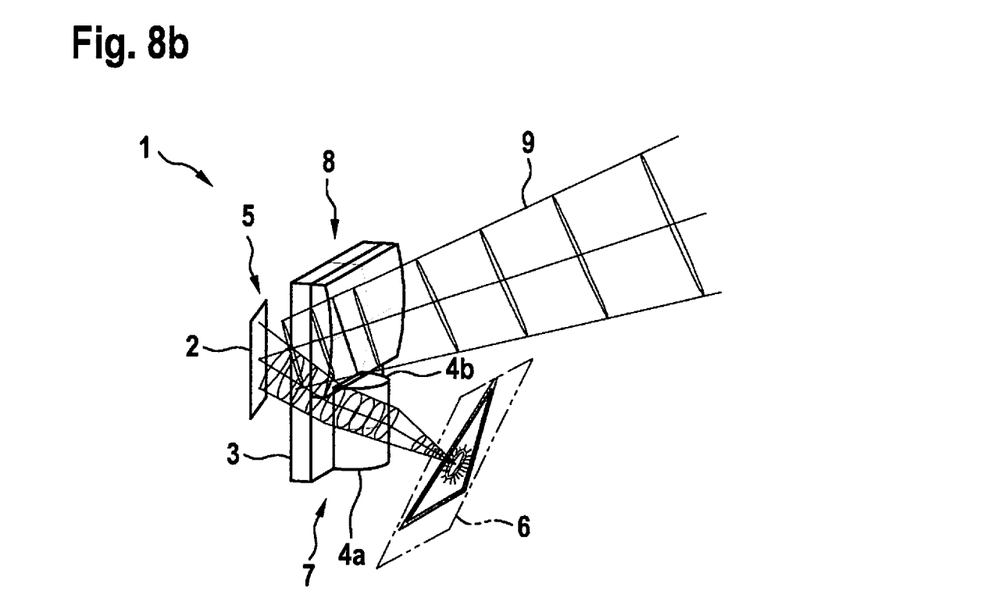

FIGS. 8a and 8b show a micromechanical light deflection device with a non-deflected MEMS mirror (FIG. 8a) and with a deflected MEMS mirror (FIG. 8b) according to another specific embodiment of the present invention.

FIG. 8 essentially shows a micromechanical light deflection device 1 according to FIG. 4. A laser 6 of the "edge emitter" type, for example a laser diode, is now used in the process. As was already described for FIGS. 7a and 7b, a laser line 9 is provided in this way, with rotated MEMS mirror 2, after passage through micromechanical light deflection device 1. Cylindrical lens 4a at inlet 7 is used as a collimation lens, and cylindrical lens 4b at outlet 8 is used for adjusting the angle for the line length. The axes of the two cylindrical lenses are situated perpendicularly to one another.

Figure 9:
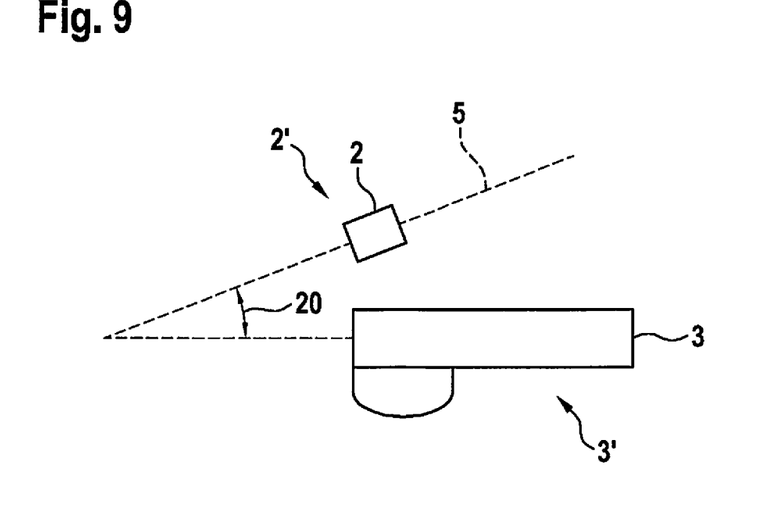
FIG. 9 shows a micromechanical light deflection device according to another specific embodiment of the present invention.

FIG. 9 shows a micromechanical light deflection device according to another specific embodiment of the present invention.

FIG. 9 essentially shows a section of a micromechanical light deflection device 1 according to FIG. 1. In contrast to micromechanical light deflection device 1 according to FIG. 1, mirror plane 2' of MEMS mirror 2 of micromechanical light deflection device 1 according to FIG. 9 is rotated in a non-deflected position with respect to plane 3' of cover glass 3 by angle 20. Angle 20 may assume any value between 2° and 20°.

In FIGS. 1, 6, 7 and 8, laser beam 9 is focused onto MEMS mirror 2 by the introduction of a lens at inlet 4. In this way, the mirror surface of MEMS mirror 2 may be reduced. Moreover, laser beam 9 is stationary at this location, thereby also making it possible to use a symmetrical lens, for example to collimate laser beam 9 in one direction and focus it in another direction.

In FIGS. 2, 3 and 5, a lens is situated at outlet 8. It may have a curved design, a tilting of a laser line being preventable with larger deflection angles. If a lens is used both at the inlet and at the outlet of light deflection device 1, i.e., for example, according to FIG. 4, laser beam 9 may be shaped in an extremely flexible manner with the aid of the passive beam shaping element. If the cover, for example the cover glass, is slightly tilted with respect to the resting position of the MEMS mirror, for example between 2° and 20°, static spurious reflections on cover glass 3, which are not preventable by an anti-reflection coating, may be avoided, or at least reduced. To improve the line homogeneity of the laser line, it is also possible to use aspherically shaped cylindrical lenses, for example Powell lenses, which homogeneously project the inhomogeneous light distribution of a laser beam onto the entire line.

In summary, at least one specific embodiment of the present invention has at least one of the following advantages:

It is possible to integrate or implement optical partial components of a transmission unit, for example, of a laser transmission unit, in a cover, in particular, a cover glass. As a result of the dual use of the cover glass as a cover on the one hand, and as a passive beam shaping element on the other hand, a cost advantage with respect to the laser transmission optics may be achieved, since the adjustment complexity and the number of optical components are reduced. This applies, in particular, to a laser transmission unit emitting a linear signal. In particular, a one-dimensional MEMS mirror may be used for this purpose, which may deflect the laser beam about an axis, for example by +/25°.

If a spotlighting semiconductor laser, preferably a VeCSEL or a VCSEL, is used, a laser line may be generated from a round laser beam with the aid of a cylindrical lens. If a semiconductor laser of the "edge emitter" design is used, its linear exit aperture and its different divergence angle in the vertical and horizontal directions may be shaped into a line by using one or two cylindrical lens(es). The exit angle of the laser line is adjusted, for example, by the position and the focal length of the corresponding cylindrical lens.

Another advantage is that the installation space between the transmission optics, i.e., in particular, between a laser and the MEMS mirror, may be considerably reduced. The MEMS mirror surface may also be reduced when the laser focus is preferably placed onto the MEMS mirror. Another advantage is that a lens on the cover glass may also be utilized as a collimation lens. Moreover, a simple manufacture of the micromechanical light deflection device is possible, since the passive beam shaping element is manufacturable together with the cover in one production process. The passive beam shaping element may be situated at the inlet, at the outlet, or both at the inlet and at the outlet of the micromechanical light deflection device.

Although the present invention has been described based on preferred exemplary embodiments, it is not limited thereto, but is modifiable in a variety of ways.

What is claimed is:

1. A micromechanical light deflection device, comprising:
   a micromechanical light deflection unit; and
   a transparent cover for the micromechanical light deflection unit, the transparent cover including at least one integral passive beam shaping unit for a light beam;
   wherein the passive beam shaping unit is situated at an inlet or outlet for the micromechanical light deflection device, and
   wherein the transparent cover is a planar cover glass.

2. The micromechanical light deflection device as recited in claim 1, wherein the passive beam shaping unit is situated at the inlet for the micromechanical light deflection device.

3. The micromechanical light deflection device as recited in claim 1, wherein the passive beam shaping unit includes at least one lens.

4. The micromechanical light deflection device as recited in claim 3, wherein the at least one lens includes at least one cylindrical lens.

5. The micromechanical light deflection device as recited in claim 3, wherein the lens is a cylindrical lens or as a Powell lens.

6. A micromechanical light deflection device, comprising:
   a micromechanical light deflection unit; and
   a transparent cover for the micromechanical light deflection unit, the transparent cover including at least one integral passive beam shaping unit for a light beam;
   wherein the transparent cover is a planar cover glass.

7. The micromechanical light deflection device as recited in claim 6, wherein the micromechanical light deflection unit includes a micromechanical mirror configured for light deflection, which is at least partially rotatable about an axis.

8. The micromechanical light deflection device as recited in claim 7, wherein a mirror plane of the micromechanical mirror for deflection of light is in a resting position and a plane of the cover glass is rotated by an angle with respect to one another.

9. The micromechanical light deflection device as recited in claim 8, wherein the angle is between 1° and 35°.

10. The micromechanical light deflection device as recited in claim 8, wherein the angle is between 2° and 20°.

11. The micromechanical light deflection device as recited in claim 8, wherein the angle is between 5° and 15°.

12. The micromechanical light deflection device as recited in claim 8, wherein the angle is between 7.5° and 12.5°.

13. A micromechanical light deflection device, comprising:
    a micromechanical light deflection unit; and
    a transparent cover for the micromechanical light deflection unit, the transparent cover including at least one integral passive beam shaping unit for a light beam;
    wherein the passive beam shaping unit includes at least one lens, and
    wherein the lens is a Powell lens, and
    wherein the transparent cover is a planar cover glass.

14. A method for deflection of light using a micromechanical light deflection device, the method comprising:
    deflecting a light beam using the micromechanical light deflection unit, and the light beam being shaped using a transparent cover of the micromechanical light deflection unit which includes an integral passive beam shaping unit;
    wherein the passive beam shaping unit is situated at an outlet for the micromechanical light deflection device, and
    wherein the transparent cover is a planar cover glass.

15. A light transmission device, comprising:
    a micromechanical light deflection device, including a micromechanical light deflection unit, and a transparent cover for the micromechanical light deflection unit, the transparent cover including at least one integral passive beam shaping unit for a light beam; and
    a light transmission unit configured to transmit the light beam;
    wherein the passive beam shaping unit is situated at an outlet for the micromechanical light deflection device, and
    wherein the transparent cover is a planar cover glass.

16. The light transmission device as recited in claim 15, wherein the light transmission unit is a laser.

17. The light transmission device as recited in claim 15, wherein the light transmission unit is a spotlighting semiconductor laser.

18. The light transmission device as recited in claim 15, wherein the light transmission unit is an "edge emitter" type semiconductor laser.

* * * * *